United States Patent
Ryu et al.

(10) Patent No.: US 10,691,212 B2
(45) Date of Patent: Jun. 23, 2020

(54) MANIPULATION CONTROL APPARATUS FOR VEHICLES AND OPERATION METHOD THEREOF

(71) Applicants: HYUNDAI MOTOR COMPANY, Seoul (KR); KIA MOTORS CORPORATION, Seoul (KR)

(72) Inventors: Yang Ho Ryu, Yongin-si (KR); Jong Kyo An, Osan-si (KR); Sang Min Moon, Seoul (KR)

(73) Assignees: Hyundai Motor Company (KR); KIA Motors Corporation (KR)

( * ) Notice: Subject to any disclaimer, the term of this patent is extended or adjusted under 35 U.S.C. 154(b) by 0 days.

(21) Appl. No.: 16/213,015

(22) Filed: Dec. 7, 2018

(65) Prior Publication Data

US 2020/0064923 A1    Feb. 27, 2020

(30) Foreign Application Priority Data

Aug. 22, 2018  (KR) .................. 10-2018-0098080

(51) Int. Cl.
| | |
|---|---|
| G06F 3/01 | (2006.01) |
| G06F 3/0482 | (2013.01) |
| H02P 6/30 | (2016.01) |
| G06F 3/16 | (2006.01) |
| H02P 6/04 | (2016.01) |
| G06F 3/0484 | (2013.01) |

(52) U.S. Cl.
CPC ............ G06F 3/016 (2013.01); G06F 3/0482 (2013.01); G06F 3/04847 (2013.01); G06F 3/167 (2013.01); H02P 6/04 (2013.01); H02P 6/30 (2016.02)

(58) Field of Classification Search
None
See application file for complete search history.

(56) References Cited

U.S. PATENT DOCUMENTS

| | | | | |
|---|---|---|---|---|
| 2008/0000762 A1* | 1/2008 | Kurihara | ................ | B60K 37/06 |
| | | | | 200/293 |
| 2015/0199012 A1* | 7/2015 | Palmer | .................... | G06F 3/016 |
| | | | | 345/184 |
| 2018/0113512 A1* | 4/2018 | Kang | .................... | G06F 3/0488 |

FOREIGN PATENT DOCUMENTS

| | | |
|---|---|---|
| KR | 10-2006-0087031 A | 8/2006 |
| KR | 10-2011-0003106 A | 1/2011 |

OTHER PUBLICATIONS

Annie Rydstrom et al., Can Haptics Facilitate Interaction with an In-Vehicle Multifunctional Interface, Jul. 1, 2009, IEEE, pp. 141-147 (Year: 2009).*

Rick Komerska et al., A study of haptic linear and pie menus in a 3D Fish Tank VR Environment, Jan. 1, 2004, IEEE Computer Society, pp. 1-8 (Year: 2004).*

* cited by examiner

*Primary Examiner* — Tam T Tran

(74) *Attorney, Agent, or Firm* — Brinks Gilson & Lione

(57) ABSTRACT

A click sensation provision method for vehicles performed by a manipulation control apparatus for vehicles is provided. The method includes determining the number of selection menu items on a screen that is being displayed in a vehicle, selecting a click sensation corresponding to the determined number from among a plurality of different click sensations, and providing the selected click sensation to a user through a manipulation unit for manipulating the screen.

20 Claims, 13 Drawing Sheets

MANIPULATION CONTROL APPARATUS FOR VEHICLES AND OPERATION METHOD THEREOF

CROSS REFERENCE TO RELATED APPLICATION

This application claims priority to and the benefit of Korea Application No. 10-2018-0098080 filed on Aug. 22, 2018 which is hereby incorporated in its entirety by reference.

FIELD

The present disclosure provides a manipulation control apparatus for vehicles and an operation method thereof.

BACKGROUND

The statements in this section merely provide background information related to the present disclosure and may not constitute prior art.

In general, an audio video navigation (AVN) system, provided in a vehicle, may display a screen having various selection menu items for selection by a user as desired.

Consequently, the user must directly view the screen in order to recognize how many selection menu items are being displayed on the screen. As a result, the user's gaze is distracted during driving, which may impede safe driving.

In addition, great effort has been made in recent years to provide various functions to a user in a vehicle, thereby improving the marketability of the vehicle.

SUMMARY

Accordingly, some forms of the present disclosure are directed to a manipulation control apparatus for vehicles and an operation method thereof that substantially obviate one or more problems due to limitations and disadvantages of the related art.

An aspect of the present disclosure is to provide a manipulation control apparatus for vehicles that is capable of providing information about a screen that is displayed in a vehicle to a user using various click sensations and a click sensation provision method thereof.

Another aspect of the present disclosure is to provide a manipulation control apparatus for vehicles that is capable of enabling a user to rapidly select a desired menu item on a screen that is displayed in a vehicle and a menu item selection method thereof.

In one form of the present disclosure, a click sensation provision method for vehicles performed by a manipulation control apparatus for vehicles includes determining the number of selection menu items on a screen that is being displayed in a vehicle, selecting a click sensation corresponding to the determined number from among a plurality of different click sensations, and providing the selected click sensation to a user through a manipulation unit for manipulating the screen.

For example, click sensations that differ depending on the number or a numeric range of the selection menu items on the screen may be set in advance.

For example, the method may further include determining whether the user wishes to receive click sensations that differ depending on the determined number, wherein the selected click sensation may be provided to the user in response to the result of the determination.

For example, the click sensation may include at least one of an audible sensation or a tactile sensation.

For example, the number of clicks for the sensation may be proportional to the number of the selection menu items on the screen.

In another form of the present disclosure, a manipulation control apparatus for vehicles includes a number determination unit for determining the number of selection menu items on a screen that is being displayed in a vehicle, a click sensation selection unit for selecting a click sensation corresponding to the determined number from among a plurality of different click sensations, and a click sensation provision unit for providing the selected click sensation to a user through a manipulation unit for manipulating the screen.

For example, the number determination unit may include an AVN head unit.

For example, the click sensation selection unit may include a main controller for generating a driving control signal corresponding to the determined number, a motor-driving unit for generating a motor-driving signal corresponding to the driving control signal, a motor rotatable at the number of rotations corresponding to the motor-driving signal, a cylinder unit rotatable at the same number of rotations as the motor, and a plurality of protrusions protruding from the cylinder unit in different directions, the protrusions being spaced apart from each other, one of the protrusions contacting the click sensation provision unit when the cylinder unit is rotated.

For example, the click sensation provision unit may include a plurality of rotary plates coupled to the manipulation unit, which is manipulated by the user, so as to be interlocked with the manipulation unit, each of the rotary plates being provided at the outer circumferential surface thereof with ridges and valleys, which are alternately arranged, the rotary plates having different numbers of ridges and valleys, one of the protrusions may face one of the rotary plates when the cylinder unit is rotated, and when the manipulation unit is rotated, the protrusion that faces the rotary plate may alternately contact the ridges and the valleys of the rotary plate that faces the protrusion, whereby the selected click sensation may be generated and transmitted to the manipulation unit.

In another form of the present disclosure, a manipulation control apparatus for vehicles includes a rotary plate coupled to a manipulation unit, which is manipulated by a user, so as to be interlocked with the manipulation unit, the rotary plate being provided at the outer circumferential surface thereof with ridges and valleys, which are alternately arranged, a protrusion unit having one end that contacts the rotary plate, a cylinder unit that contacts the other end of the protrusion unit, the pressure of air in the cylinder unit being changed due to piston movement of the protrusion unit when the rotary plate is rotated, a pneumatic sensor for sensing variation in the pressure of air in the cylinder unit and outputting the result of sensing as an electrical signal, a main controller for calculating the number of movement clicks of the manipulation unit using the electrical signal, and a menu item selection unit for selecting a corresponding menu item from among selection menu items on a screen that is being displayed in a vehicle based on the calculated number of movement clicks.

For example, the cylinder unit may include an elastic member disposed between the other end of the protrusion unit and the inner wall of the cylinder unit, the elastic member allowing the piston movement of the protrusion unit when the one end of the protrusion unit contacts the ridges and the valleys of the rotary plate.

For example, the protrusion unit may include a first protrusion unit that contacts one surface of the rotary plate and a second protrusion unit that contacts the other surface of the rotary plate, which is opposite the one surface of the rotary plate, the one surface and the other surface of the rotary plate having different protruding heights.

For example, the cylinder unit may include a first cylinder unit that contacts the first protrusion unit, the pressure of air in the first cylinder unit being changed due to piston movement of the first protrusion unit when the rotary plate is rotated, and a second cylinder unit that contacts the second protrusion unit, the pressure of air in the second cylinder unit being changed due to piston movement of the second protrusion unit when the rotary plate is rotated.

For example, the pneumatic sensor may include a first pneumatic sensor for sensing variation in the pressure of air in the first cylinder unit and outputting the result of sensing as a first electrical signal and a second pneumatic sensor for sensing variation in the pressure of air in the second cylinder unit and outputting the result of sensing as a second electrical signal.

For example, the first pneumatic sensor may include a first amplifier for amplifier for amplifying the result of sensing and outputting the result of amplifying as the first electrical signal, and the second pneumatic sensor may include a second amplifier for amplifier for amplifying the result of sensing and outputting the result of amplifying as the second electrical signal.

For example, the main controller may determine the rotational direction of the manipulation unit using the first and second electrical signals, and the menu item selection unit may select the corresponding menu item using at least one of the number of movement clicks or the rotational direction.

For example, the main controller may determine the rotational direction using a difference in phase between the first electrical signal and the second electrical signal.

For example, the manipulation control apparatus may further include an analog-to-digital converter for converting the electrical signal output from the pneumatic sensor, which is an analog signal, into a digital electrical signal, wherein the main controller may calculate the number of movement clicks using the digital electrical signal.

In one form of the present disclosure, a menu item selection method performed by the manipulation control apparatus for vehicles includes sensing variation in the pressure of air in the cylinder unit and generating the result of sensing as an electrical signal, calculating the number of movement clicks using the electrical signal, and selecting the corresponding menu item based on the number of movement clicks.

For example, the method may further include determining the rotational direction of the manipulation unit using the electrical signal, wherein the corresponding menu item may be selected using at least one of the number of movement clicks or the rotational direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
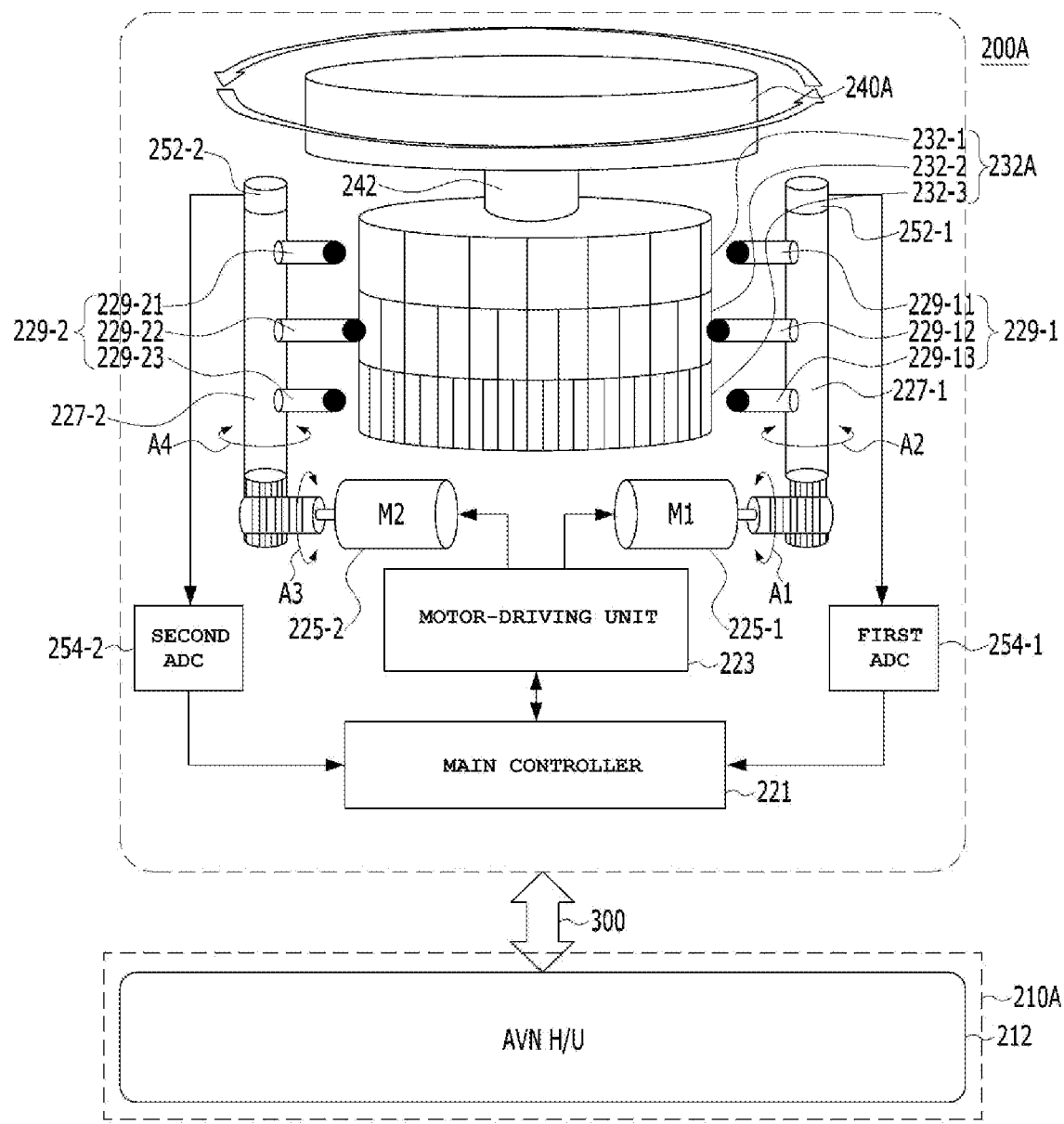
FIG. 5 is a block diagram showing a manipulation control apparatus for vehicles in one form of the present disclosure.
Figure 12:
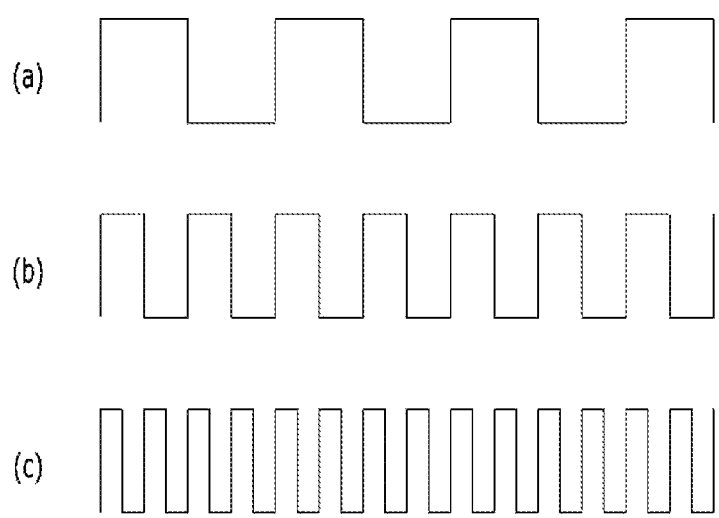
Figure 13:
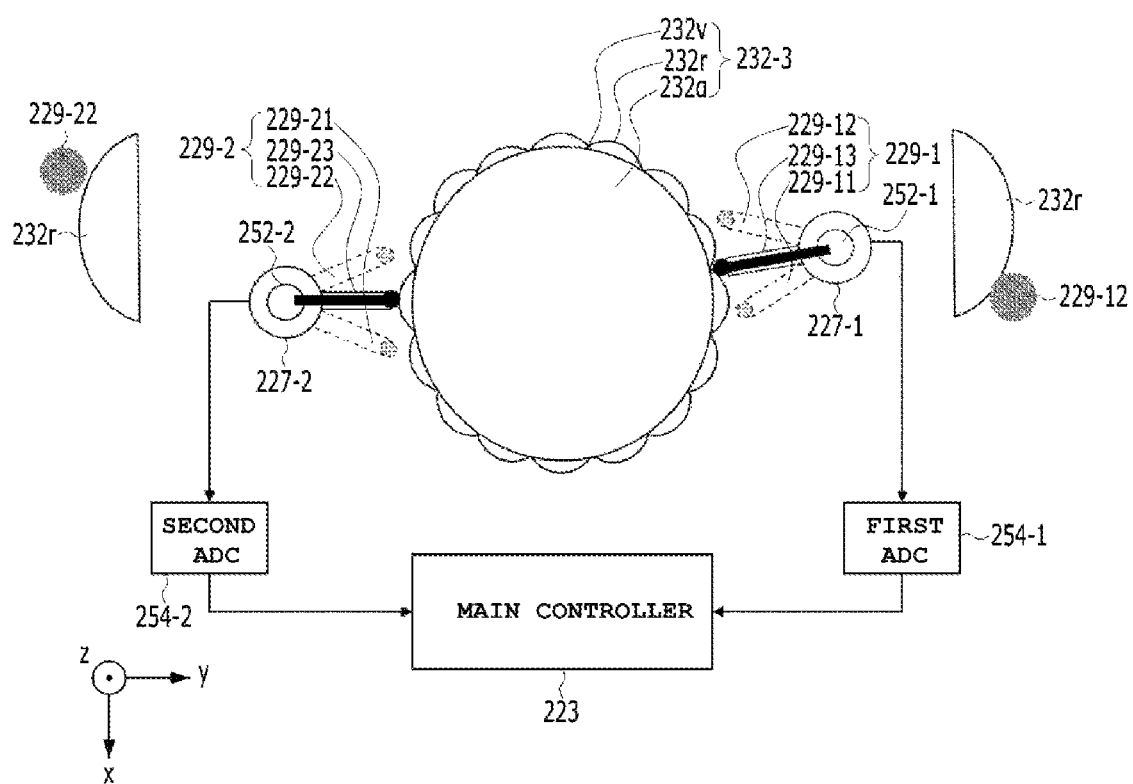
Figure 14:
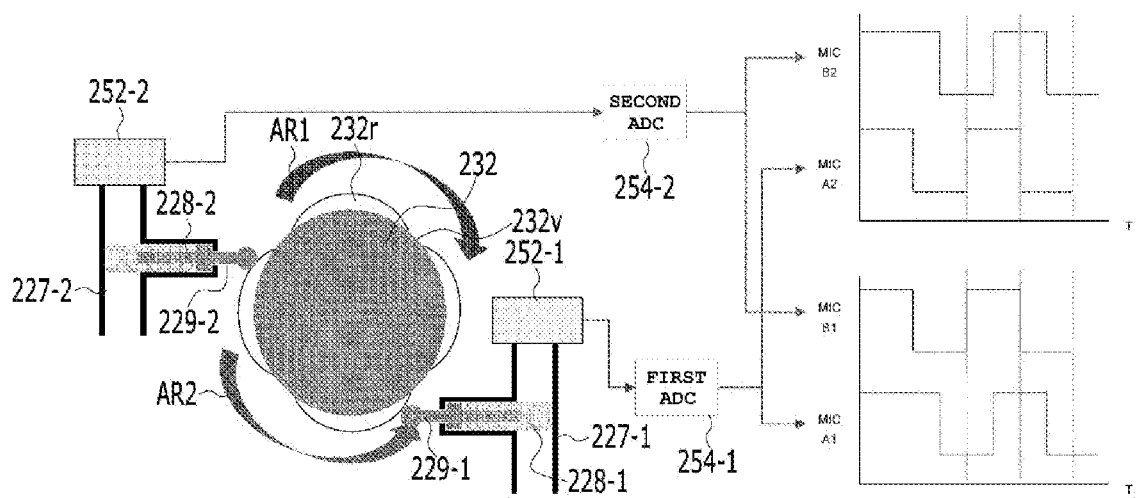

FIGS. 12(a) to 12(c) are views showing the waveforms of electrical signals generated due to pneumatic variation that is sensed;

FIG. 13 is a plan view of the manipulation control apparatus shown in FIG. 5; and FIG. 14 is a view illustrating the concept of rotational direction recognition performed by the apparatus shown in FIG. 13.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, as used herein, relational terms, such as "first", "second", "on"/"upper"/"above", "under"/"lower"/"below," and the like, are used solely to distinguish one entity or element from another entity or element without necessarily requiring or implying any physical or logical relationship or order between such entities or elements.

Hereinafter, a manipulation control apparatus for vehicles in some forms of the present disclosure will be described using a Cartesian coordinate system. However, the disclosure is not limited thereto. That is, an x axis, a y axis, and a z axis of the Cartesian coordinate system are perpendicular to each other. However, the disclosure is not limited thereto. That is, the x axis, the y axis, and the z axis may be defined at oblique angles relative to each other.

Figure 1:
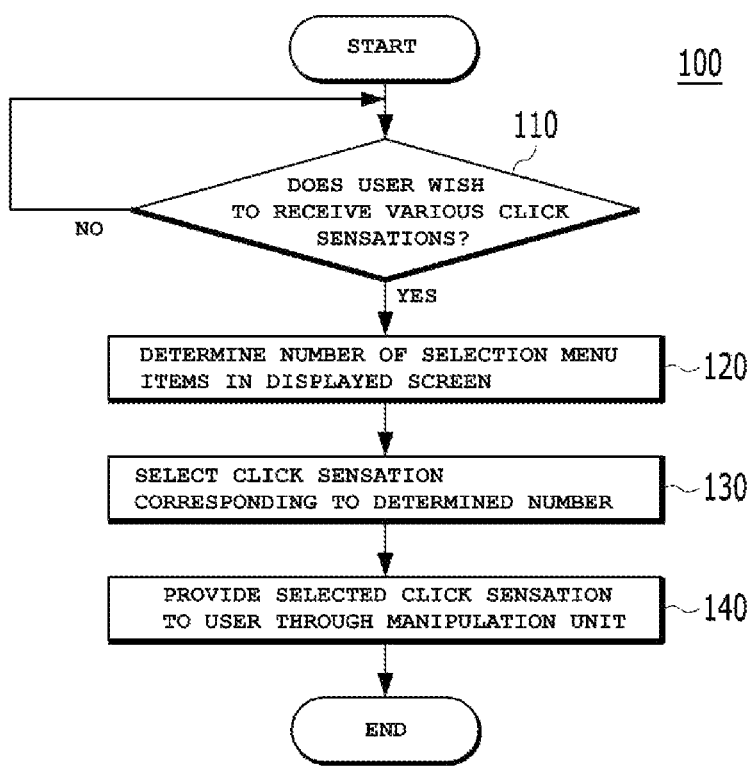
FIG. 1 is a flowchart illustrating a click sensation provision method for vehicles, which is an form of an operation method performed by a manipulation control apparatus for vehicles in one form of the present disclosure.

FIG. 1 is a flowchart illustrating a click sensation provision method 100 for vehicles, which is a form of an operation method performed by a manipulation control apparatus 200 or 200A for vehicles in some forms of the present disclosure.

Here, the manipulation control apparatus may be a multimedia device. However, the disclosure is not limited with regard to the specific form of the manipulation control apparatus. The multimedia device may be a device provided in a vehicle in the state in which an audio device, a video device, and a navigation device are integrated.

Figure 2:
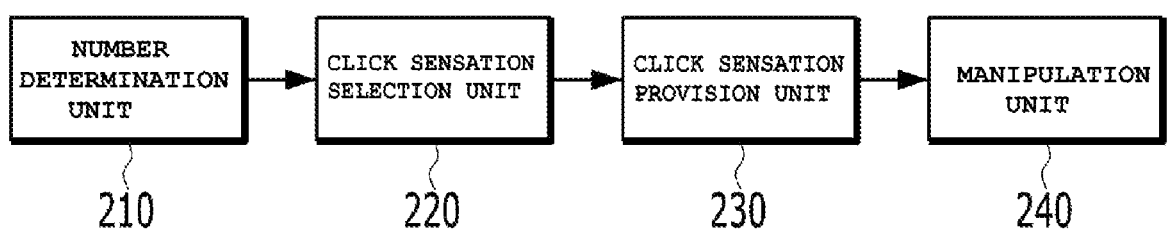
FIG. 2 is a block diagram showing a manipulation control apparatus for vehicles in one form of the present disclosure, which performs the click sensation provision method shown in FIG. 1.

FIG. 2 is a block diagram showing a manipulation control apparatus 200 for vehicles, which performs the click sensation provision method 100 shown in FIG. 1. The manipulation control apparatus 200 may include a number determination unit 210, a click sensation selection unit 220, a click sensation provision unit 230, and a manipulation unit 240.

Referring to FIGS. 1 and 2, whether a user wishes to receive click sensations that differ depending on the number of selection menu items on a screen that is being displayed in a vehicle is determined (Step 110).

Figure 3A:
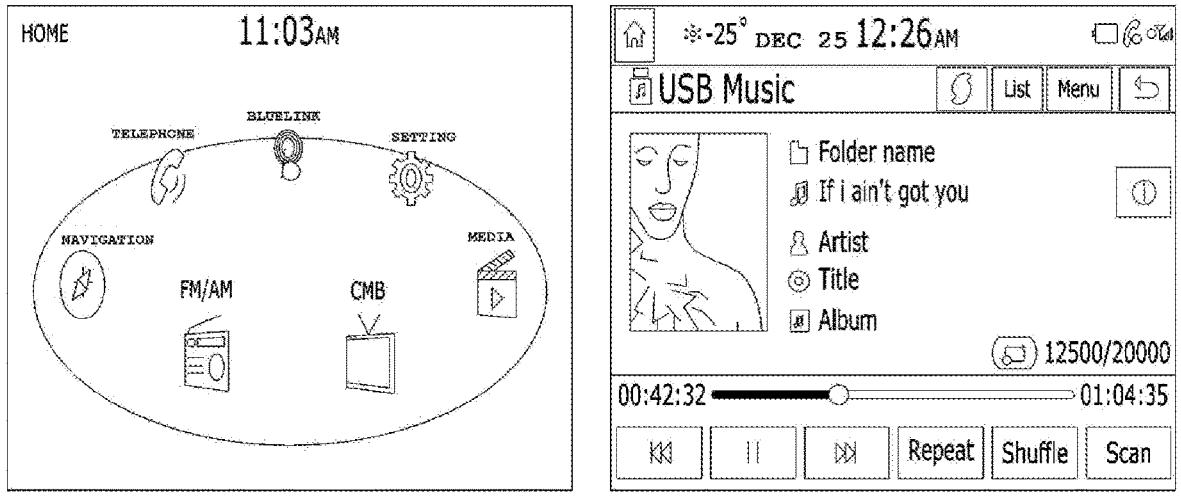
FIGS. 3A to 3C are views exemplarily showing various screens that can be displayed in a vehicle.
Figure 3B:
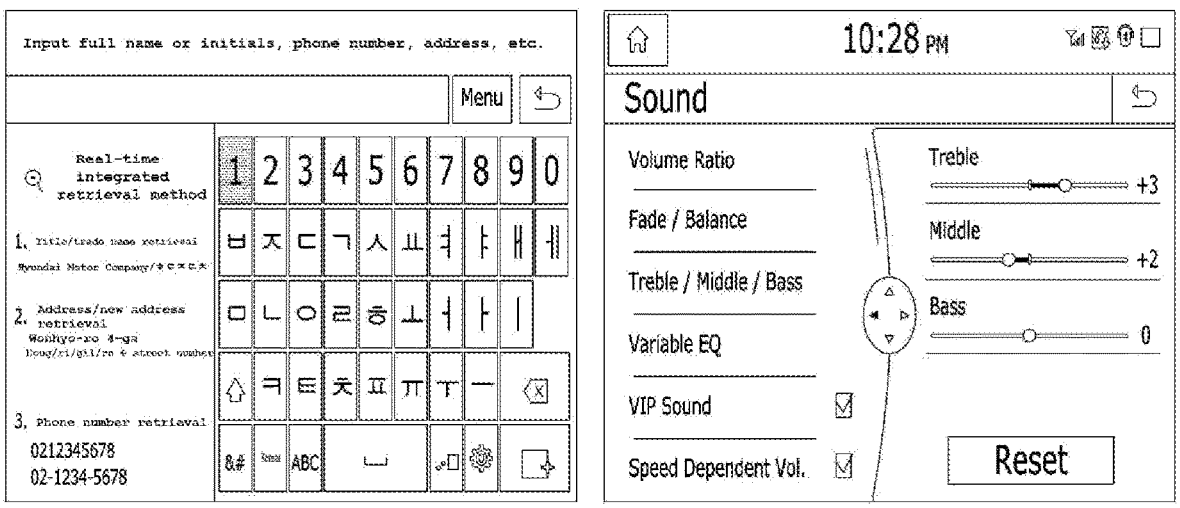
Figure 3C:
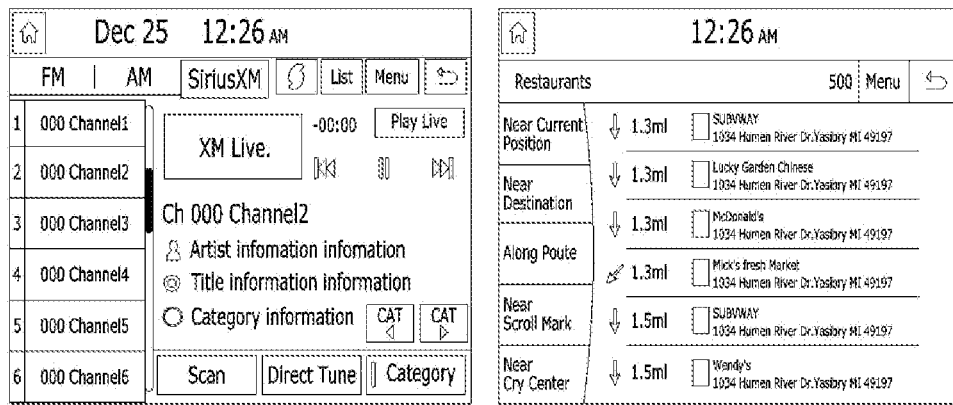

FIGS. 3A to 3C exemplarily show various screens that can be displayed in a vehicle.

A screen that can be displayed in a vehicle may have several selection menu items. Therefore, the number of selection menu items on a screen may vary depending on the menu item.

For example, a screen that can be displayed in a vehicle may have less than 10 selection menu items. Examples of this screen may include a home screen, a navigation screen, and an audio/video (A/V) screen, as shown in FIG. 3A.

Alternatively, a screen that can be displayed in a vehicle may have 10 to less than 50 selection menu items. Examples of this screen may include a keyboard screen and an audio video navigation (AVN) setting screen, as shown in FIG. 3B.

As another alternative, a screen that can be displayed in a vehicle may have 50 or more selection menu items. Examples of this screen may include a digital broadcasting station screen, a song name list screen, and a point-of-interest (POI) screen, as shown in FIG. 3C.

A click sensation is a sensation that is transmitted to a user via the manipulation unit 240 when the user manipulates (for example, clicks) the manipulation unit 240 in order to select a desired one from among selection menu items on a screen that is displayed. The click sensation may include at least one of an audible sensation or a tactile sensation.

For example, in the case in which the manipulation unit 240 is manipulated through a jog shuttle system, when the manipulation unit 240, which is realized as a round knob like a dial, is rotated in the clockwise direction or in the counterclockwise direction and then clicked, at least one of a tactile sensation that is transmitted to a user through the manipulation unit 240 through vibration such as trembling (for example, "brrr") or an audible sensation that is transmitted to a user through a sound such as a clicking sound (or a clunk) may correspond to a click sensation. However, the disclosure is not limited with regard to a specific type of the click sensation.

In addition, click sensations that differ depending on the number or numeric range of selection menu items on a screen may be set in advance. For example, the number of clicks for a tactile sensation such as trembling or an audible sensation such as a clicking sound when a knob is rotated the same angle may be set in advance so as to increase (or decrease) in proportion to the number of selection menu items on a screen. That is, the number of clicks for a tactile sensation may be set in advance such that, as the number of selection menu items increases, the number of clicks for a click sensation corresponding to at least one of a tactile sensation or an audible sensation increases within a predetermined time and such that, as the number of selection menu items decreases, the number of clicks for a click sensation corresponding to at least one of a tactile sensation or an audible sensation decreases within a predetermined time. For example, the number of trembling variations or the number of clicking sounds when a knob is rotated about 10 degrees may increase in proportion to the number of selection menu items. For example, when a knob is rotated 360 degrees, the number of clicks for a click sensation may be set to 16 in the case of a screen having a small number of selection menu items, as shown in FIG. 3A, the number of clicks for a click sensation may be set to in the case of a screen having a large number of selection menu items, as shown in FIG. 3C, and the number of clicks for a click sensation may be set to 32 in the case of a screen having a larger number of selection menu items than the selection menu items shown in FIG. 3A and a smaller number of selection menu items than the selection menu items shown in FIG. 3C, as shown in FIG. 3B.

At Step 110, the user may be a driver or a passenger who sits in the seat next to the driver or in the back seat of a vehicle.

Figure 4:
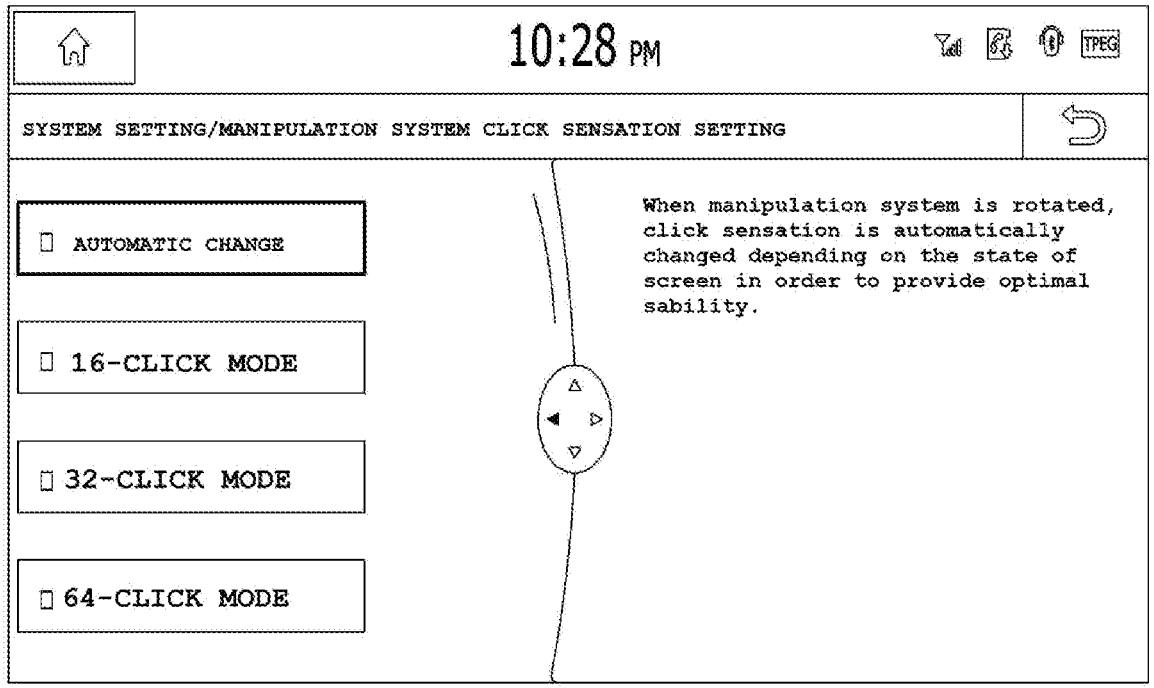
FIG. 4 is a view showing an example of a screen that is shown to a user in order to perform Step 110.

FIG. 4 shows an example of a screen that is shown to a user in order to perform Step 110.

In the case in which the screen illustrated in FIG. 4 is shown, a user who wishes to receive click sensations that differ depending on the number of selection menu items on a screen that is being displayed in a vehicle through the manipulation unit 240 may set an "automatic change" mode.

Alternatively, a user who wishes to receive a click sensation having a fixed number of clicks, e.g. 16, irrespective of the number of selection menu items on a screen that is being displayed in a vehicle through the manipulation unit 240 may set a "16-click mode".

As another alternative, a user who wishes to receive a click sensation having a fixed number of clicks, e.g. 32, irrespective of the number of selection menu items on a screen that is being displayed in a vehicle through the manipulation unit 240 may set a "32-click mode".

As a further alternative, a user who wishes to receive a click sensation having a fixed number of clicks, e.g. 64, irrespective of the number of selection menu items on a screen that is being displayed in a vehicle through the manipulation unit 240 may set a "64-click mode".

In addition, when the user does not select a specific mode on the screen shown in FIG. 4, the manipulation control apparatus 200 may be set in advance so as to execute one of the automatic change mode, the 16-click mode, the 32-click mode, and the 64-click mode.

When a user wishes to receive a click sensation having the number of clicks set differently depending on the number of selection menu items on a screen that is being displayed in a vehicle through the manipulation unit 240, the number determination unit 210 may determine (or judge or check) the number of selection menu items on the screen that is being displayed in the vehicle, and may output the determined number to the click sensation selection unit 220 (Step 120).

After Step 120, the click sensation selection unit 220 may select a click sensation corresponding to the determined number from among different click sensations, and may output the selected click sensation to the click sensation provision unit 230 (Step 130).

After Step 130, the click sensation provision unit 230 may provide the selected click sensation to a user through the manipulation unit 240 (Step 140).

Figure 6:
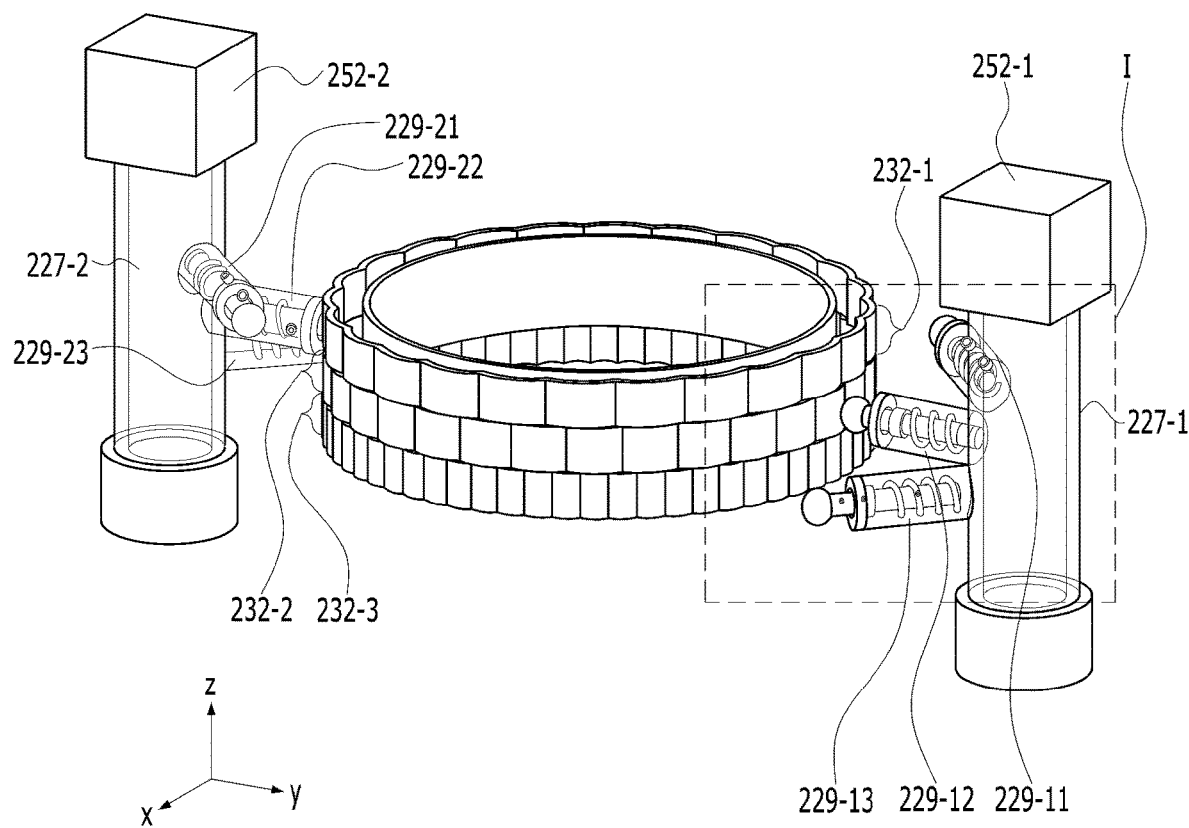
FIG. 6 is a perspective view showing the manipulation control apparatus.
Figure 7:
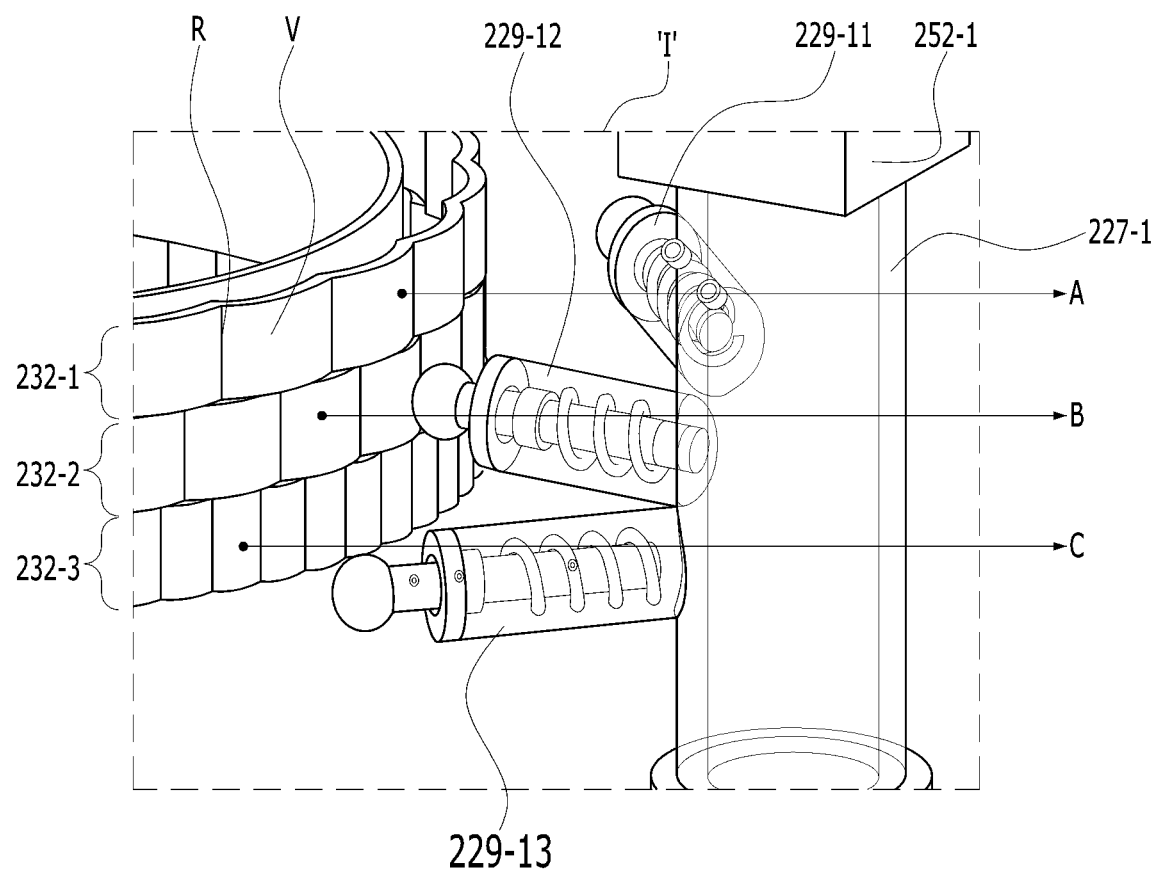
FIG. 7 is an enlarged perspective view showing part 'I' of FIG. 6.
Figure 8:
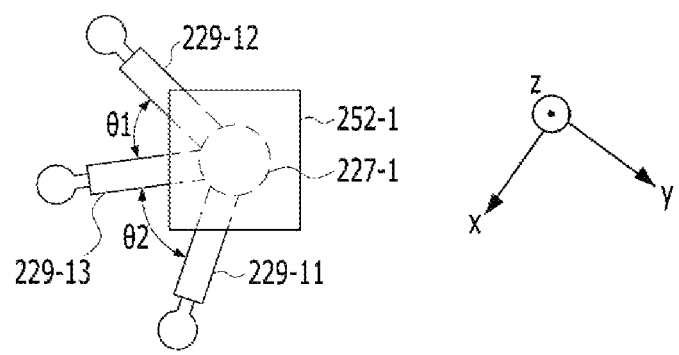
FIG. 8 is a plan view of a first cylinder unit, a first protrusion unit, and a first pneumatic sensor shown in FIG. 6.

FIG. 5 is a block diagram showing a manipulation control apparatus 200A for vehicles in some forms of the present disclosure, FIG. 6 is a perspective view showing the manipulation control apparatus 200A, FIG. 7 is an enlarged perspective view showing part 'I' of FIG. 6, and FIG. 8 is a plan view of a first cylinder unit 227-1, a first protrusion unit 229-1, and a first pneumatic sensor 252-1 shown in FIG. 6.

For the convenience of description, a main controller 221, a motor-driving unit 223, first and second motors (M1 and M2) 225-1 and 225-2, first and second analog-to-digital converters (ADCs) 254-1 and 254-2, and the manipulation unit 240, which are shown in FIG. 5, are omitted from FIG. 6.

The manipulation control apparatus 200A shown in FIGS. 5 to 8 corresponds to some forms of the manipulation control apparatus 200 shown in FIG. 2, and may perform the operation method 100 of the manipulation control apparatus 200.

In order to perform the click sensation provision method 100 shown in FIG. 1, the manipulation control apparatus 200A shown in FIG. 5 may include a main controller 221, a motor-driving unit 223, at least one of a first or second motor 225-1 or 225-2, at least one of a first or second cylinder unit 227-1 or 227-2, and at least one of a first or second protrusion unit 229-1 or 229-2. In addition, the manipulation control apparatus 200A shown in FIG. 5, which performs the method 100 shown in FIG. 1, may not include first and second pneumatic sensors 252-1 and 252-2 or first and second analog-to-digital converters (ADCs) 254-1 and 254-2.

The manipulation control apparatus 200A may include a number determination unit 210A, a click sensation selection unit, a click sensation provision unit, and a manipulation unit 240A. Here, the number determination unit 210A, the click sensation selection unit, the click sensation provision unit, and the manipulation unit 240A correspond to some forms of the number determination unit 210, the click sensation selection unit 220, the click sensation provision unit 230, and the manipulation unit 240, and perform the same functions. Consequently, duplicate descriptions thereof will be omitted.

Referring to FIG. 5, the number determination unit 210A may include an AVN head unit (H/U) 212. The AVN head unit 212 may perform Step 110 and Step 120. That is, the AVN head unit 212 may provide the number of selection menu items on the screen that is being displayed in the vehicle to the main controller 221. For example, the AVN head unit 212 may provide the number of selection menu items to the main controller 221 through CAN communication. However, the disclosure is not limited with regard to the specific communication system through which the AVN head unit 212 and the main controller 221 communicate with each other (300).

The click sensation selection unit may include the main controller 221, the motor-driving unit 223, the first or second motor (M1 or M2) 225-1 or 225-2, the first or second cylinder unit 227-1 or 227-2, and the first or second protrusion unit 229-1 or 229-2.

The main controller 221 generates a driving control signal corresponding to the number of selection menu items determined by the AVN head unit 212, and outputs the generated driving control signal to the motor-driving unit 223.

The motor-driving unit 223 generates a motor-driving signal in response to the driving control signal received from the main controller 221, and outputs the generated motor-driving signal to at least one of the first or second motor (M1 or M2) 225-1 or 225-2. For example, the motor-driving unit 223 may output voltage or current having a level determined in response to the driving control signal to a corresponding one of the first and second motors (M1 and M2) 225-1 and 225-2 as a motor-driving signal. The motor-driving signal may include a first motor-driving signal for operating the first motor (M1) 225-1 and a second motor-driving signal for operating the second motor (M2) 225-2.

The first motor (M1) 225-1 may be rotated at the number of rotations corresponding to the first motor-driving signal, and the second motor (M2) 225-2 may be rotated at the number of rotations corresponding to the second motor-driving signal.

The first cylinder unit 227-1 may be rotated at the same number of rotations as the first motor (M1) 225-1. As shown, the first motor (M1) 225-1 and the first cylinder unit 227-1 may be gear-engaged with each other such that when the first motor (M1) 225-1 is rotated in a first arrow direction A1, the first cylinder unit 227-1 is rotated in a second arrow direction A2. However, the disclosure is not limited with regard to the specific coupling form between the first motor (M1) 225-1 and the first cylinder unit 227-1, as long as the first cylinder unit 227-1 is rotated by the first motor (M1) 225-1.

The second cylinder unit 227-2 may be rotated at the same number of rotations as the second motor (M2) 225-2. As shown, the second motor (M2) 225-2 and the second cylinder unit 227-2 may be gear-engaged with each other such that when the second motor (M2) 225-2 is rotated in a third arrow direction A3, the second cylinder unit 227-2 is rotated in a fourth arrow direction A4. However, the disclosure is not limited with regard to the specific coupling form between the second motor (M2) 225-2 and the second cylinder unit 227-2 as long as the second cylinder unit 227-2 is rotated by the second motor (M2) 225-2.

The first protrusion unit 229-1 may include a plurality of 1-1 to 1-3 protrusions 229-11, 229-12, and 229-13, which protrude from the first cylinder unit 227-1 in different directions. The second protrusion unit 229-2 may include a plurality of 2-1 to 2-3 protrusions 229-21, 229-22, and 229-23, which protrude from the second cylinder unit 227-2 in different directions.

As shown, the 1-1 to 1-3 protrusions 229-11, 229-12, and 229-13 may protrude in different directions while having the first cylinder unit 227-1 as the same axes thereof so as to be spaced apart from each other. For example, referring to FIG. 8, the 1-2 protrusion 229-12 may be disposed so as to be spaced apart from the 1-3 protrusion 229-13 by a first predetermined angle θ1, and the 1-1 protrusion 229-11 may be disposed so as to be spaced apart from the 1-3 protrusion 229-13 by a second predetermined angle θ2. In addition, the 1-1, 1-2, and 1-3 protrusions 229-11, 229-12, and 229-13 may be sequentially disposed from the upper side to the lower side of the first cylinder unit 227-1 so as to be spaced apart from each other. However, the disclosure is not limited with regard to the specific angle by which the 1-1, 1-2, and 1-3 protrusions 229-11, 229-12, and 229-13 are spaced apart from each other and the specific sequence in which the 1-1, 1-2, and 1-3 protrusions 229-11, 229-12, and 229-13 are arranged from the upper side to the lower side.

The 2-1 to 2-3 protrusions 229-21, 229-22, and 229-23 may have the same construction as the 1-1, 1-2, and 1-3 protrusions 229-11, 229-12, and 229-13, and therefore a duplicate description thereof will be omitted.

In FIG. 5, each of the first and second protrusion units 229-1 and 229-2 is shown as including three protrusions.

However, the disclosure is not limited thereto. In another form of the present disclosure, each of the first and second protrusion units 229-1 and 229-2 may include two protrusions, or may include four or more protrusions. However, the number of protrusions included in each of the first and second protrusion units 229-1 and 229-2 may be plural in order to perform the method 100 shown in FIG. 1.

When the first cylinder unit 227-1 is rotated, one of the first protrusions 229-11, 229-12, and 229-13 may contact the click sensation provision unit (for example, a corresponding one selected from among a plurality of rotary plates). When the second cylinder unit 227-2 is rotated, one of the second protrusions 229-21, 229-22, and 229-23 may contact the click sensation provision unit (for example, a corresponding one of the rotary plates). As shown in FIG. 5, the 1-2 protrusion 229-12 may contact a second rotary plate 232-2 when the first cylinder unit 227-1 is rotated, and the 2-2 protrusion 229-22 may contact the second rotary plate 232-2 when the second cylinder unit 227-2 is rotated.

The click sensation provision unit may include a plurality of rotary plates 232A. For example, as shown in FIG. 5, the click sensation provision unit may include three rotary plates 232-1 to 232-3. However, the disclosure is not limited thereto. In another form of the present disclosure, the rotary plates 232A may include two rotary plates, or may include four or more rotary plates. Here, the number of rotary plates 232A may be equal to the number of first protrusions 229-1. However, the number of rotary plates 232A may be plural in order to perform the method 100 shown in FIG. 1.

When the cylinder unit is rotated, one of the first protrusions and one of the rotary plates may contact each other while facing each other. That is, when the first cylinder unit 227-1 is rotated, one of the 1-1, 1-2, and 1-3 protrusions 229-11, 229-12, and 229-13 (for example, the 1-2 protrusion 229-12 shown in FIG. 6 or 7) and one of the first to third rotary plates 232-1 to 232-3 (for example, the second rotary plate 232-2 shown in FIG. 6 or 7) may contact each other while facing each other. In addition, when the second cylinder unit 227-2 is rotated, one of the 2-1 to 2-3 protrusions 229-21, 229-22, and 229-23 and one of the first to third rotary plates 232-1 to 232-3 may contact each other while facing each other.

The rotary plates may be rotatably interlocked with the manipulation unit 240A, which is manipulated by a user. To this end, the rotary plates 232-1 to 232-3 may be connected to the manipulation unit 240A via a connection unit 242. The manipulation unit 240A may be a round knob like a dial. However, the disclosure is not limited with regard to the specific form of the manipulation unit 240A.

Referring to FIG. 7, each of the first to third rotary plates 232-1 to 232-3 is provided at the outer circumferential surface thereof with ridges R and valleys V, which are alternately arranged. The first to third rotary plates 232-1 to 232-3 have different numbers of ridges R and valleys V. In the case in which the ridges R and the valleys V are alternately arranged at the outer circumferential surface of each of the rotary plates, as described above, one of the protrusions alternately contacts the ridges R and the valleys V of a corresponding one of the rotary plates, which faces the protrusions, when the manipulation unit 240A is rotated, whereby a selected click sensation may be generated and transmitted to the manipulation unit 240A.

For example, as shown in FIG. 6, when the manipulation unit 240A is rotated in the state in which the 1-2 and 2-2 protrusions 229-12 and 229-22 contact the second rotary plate 232-2, the second rotary plate 232-2 is also rotated. At this time, the ridges R and the valleys V formed at the outer circumferential surface of the second rotary plate 232-2, which is rotated, collide with the 1-2 and 2-2 protrusions 229-12 and 229-22, whereby a click sensation may be generated and transmitted to the manipulation unit 240A.

As shown, the ridges R and the valleys V formed at the outer circumferential surfaces of the first to third rotary plates 232-1 to 232-3 may have different sizes. Consequently, in the case in which the overall sizes of the outer circumferential surfaces of the first and second rotary plates 232-1 and 232-2 are the same and in which the size of each of the ridges R and the valleys V of the first rotary plate 232-1 is greater than the size of each of the ridges R and the valleys V of the second rotary plate 232-2, the number of clicks for a click sensation generated when the first rotary plate 232-1 collides with the 1-1 and 2-1 protrusions 229-11 and 229-21 may be smaller than the number of clicks for a click sensation generated when the second rotary plate 232-2 collides with the 1-2 and 2-2 protrusions 229-12 and 229-22.

Also, in the case in which the overall sizes of the outer circumferential surfaces of the second and third rotary plates 232-2 and 232-3 are the same and in which the size of each of the ridges R and the valleys V of the second rotary plate 232-2 is greater than the size of each of the ridges R and the valleys V of the third rotary plate 232-3, the number of clicks for a click sensation generated when the second rotary plate 232-2 collides with the 1-2 and 2-2 protrusions 229-12 and 229-22 may be smaller than the number of clicks for a click sensation generated when the third rotary plate 232-3 collides with the 1-3 and 2-3 protrusions 229-13 and 229-23.

As previously described, for example, when the screen shown in FIG. 3B is displayed in the vehicle, the AVN head unit 212 may transmit a predetermined number of clicks corresponding to the number of selection menu items in the displayed screen, i.e. 32, to the main controller 221. At this time, the main controller 221 generates a driving control signal corresponding to the number of clicks, i.e. 32, and outputs the generated driving control signal to the motor-driving unit 223. As shown in FIGS. 6 and 7, the motor-driving unit 223 generates a motor-driving signal corresponding to the driving control signal corresponding to the number of clicks, i.e. 32, to rotate the motors (M1 and M2) 225-1 and 225-2 at a number of rotations corresponding thereto. As a result, the first cylinder unit 227-1 is rotated such that the 1-2 protrusion 229-12, which is one of the 1-1 to 1-3 protrusions 229-11 to 229-13, contacts the second rotary plate 232-2, and the second cylinder unit 227-2 is rotated such that the 2-2 protrusion 229-22, which is one of the 2-1 to 2-3 protrusions 229-21 to 229-23, contacts the second rotary plate 232-2.

In this way, a corresponding one of the rotary plates and a corresponding one of the protrusions may contact each other in consideration of the number of clicks transmitted from the AVN head unit 212 depending on the screen that is being displayed.

In the case in which the screen shown in FIG. 3B is changed to the screen shown in FIG. 3C, the 1-3 protrusion 229-13 may contact the third rotary plate 232-3 when the first cylinder unit 227-1 is rotated by a first predetermined angle θ1 in the clockwise direction by the first motor (M1) 225-1 in the state in which the 1-2 protrusion 229-12 contacts the second rotary plate 232-2, as shown in FIGS. 6 to 8.

Alternatively, in the case in which the screen shown in FIG. 3C is changed to the screen shown in FIG. 3A, the 1-1 protrusion 229-11 may contact the first rotary plate 232-1 when the first cylinder unit 227-1 is rotated by a second predetermined angle θ2 in the clockwise direction by the first motor (M1) 225-1 in the state in which the 1-3 protrusion 229-13 contacts the third rotary plate 232-3, as shown in FIGS. 6 to 8.

The 2-1 to 2-3 protrusions 229-21 to 229-23 may also contact a corresponding one of the first to third rotary plates 232-1, 232-2, and 232-3 when the second cylinder unit 227-2 is rotated by the second motor (M2) 225-2, similarly to the 1-1 to 1-3 protrusions 229-11 to 229-13.

As previously described, a corresponding one of the protrusions may contact a corresponding one of the rotary plates depending on the number of selection menu items on the screen that is being displayed.

At this time, when the user manipulates the manipulation unit 240A in the state in which the screen shown in FIG. 3A is being displayed, the first rotary plate 232-1 is rotated while the ridges and the valleys of the first rotary plate 232-1 contact the 1-1 and 2-1 protrusions 229-11 and 229-21, whereby a click sensation having a given number of clicks corresponding thereto may be transmitted to the user through the manipulation unit 240A. Consequently, the user may recognize (or perceive) one of the screens shown in FIGS. 3A to 3C that is being displayed based on the click sensation transmitted through the manipulation unit 240A without looking at the displayed screen. In the case in which the user is a driver, therefore, the user may recognize the kind of the screen that is being displayed without his/her gaze being distracted during driving.

Hereinafter, a menu item selection method performed by the manipulation control apparatus in some forms of the present disclosure will be described with reference to the accompanying drawings.

Figure 9:
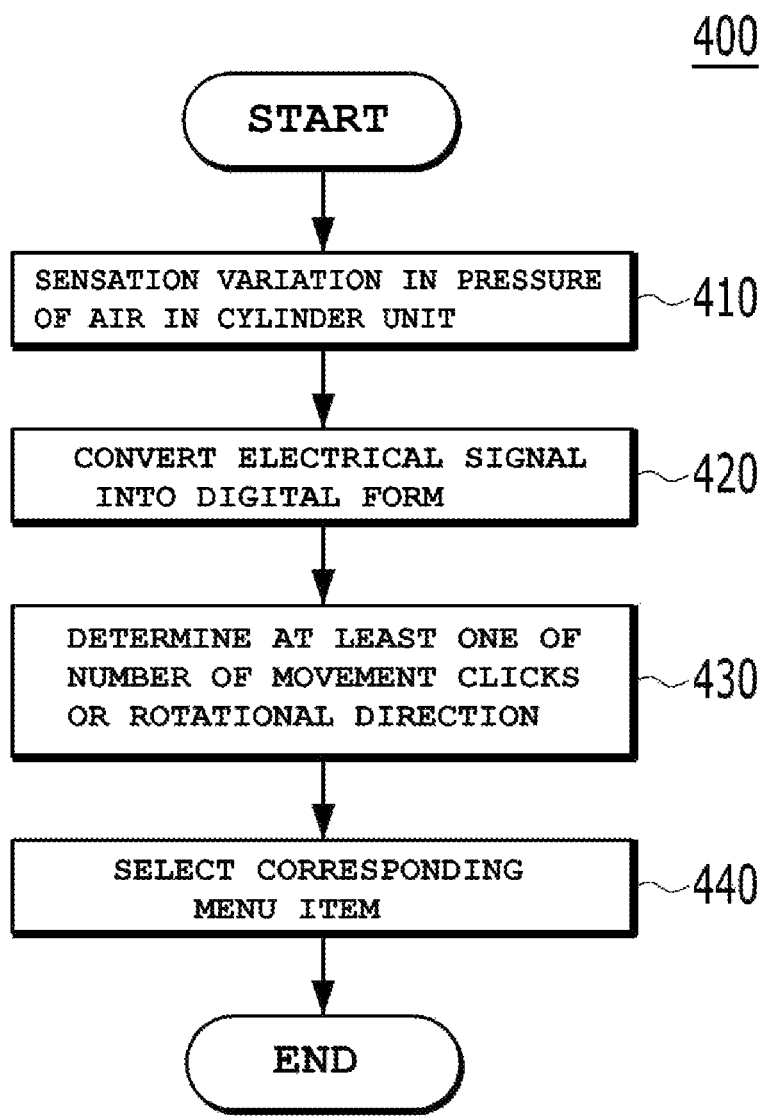
FIG. 9 is a flowchart illustrating a menu item selection method, which is another form of the operation method performed by the manipulation control apparatus in one form of the present disclosure.

FIG. 9 is a flowchart illustrating a menu item selection method 400, which is another form of the operation method performed by the manipulation control apparatus in some forms of the present disclosure.

The menu item selection method 400 shown in FIG. 9 may be performed by the manipulation control apparatus 200A shown in FIG. 5. In this case, the manipulation control apparatus 200A shown in FIG. 5 may include a main controller 221, at least one of a first or second cylinder unit 227-1 or 227-2, at least one of a first or second protrusion unit 229-1 or 229-2, at least one of a first or second pneumatic sensor 252-1 or 252-2, and a menu item selection unit 212. In addition, the manipulation control apparatus 200A shown in FIG. 5 may further include at least one of a first or second ADC 254-1 or 254-2. In this case, the first protrusion unit 229-1 may include only one of the protrusions 229-11 to 229-13, or may include more than one of the protrusions 229-11 to 229-13, and the second protrusion unit 229-2 may include only one of the protrusions 229-21 to 229-23, or may include more than one of the protrusions 229-21 to 229-23. Also, in the case in which only the method 400 shown in FIG. 9 is performed, the motor-driving unit 223 and the first and second motors (M1 and M2) 225-1 and 225-2 may be omitted from the manipulation control apparatus 200A shown in FIG. 5.

Hereinafter, a concrete construction example of the manipulation control apparatus 200A, which performs the method 400 shown in FIG. 9, will be described.

In one form of the present disclosure, the manipulation control apparatus 200A shown in FIG. 5 may include a main controller 221, a first cylinder unit 227-1, a first protrusion unit 229-1, a first pneumatic sensor 252-1, a first ADC 254-1, and a menu item selection unit 212.

In another form of the present disclosure, the manipulation control apparatus 200A shown in FIG. 5 may include a main controller 221, a second cylinder unit 227-2, a second protrusion unit 229-2, a second pneumatic sensor 252-2, a second ADC 254-2, and a menu item selection unit 212.

In some forms of the present disclosure, the manipulation control apparatus 200A shown in FIG. 5 may include a main controller 221, first and second cylinder units 227-1 and 227-2, first and second protrusion units 229-1 and 229-2, first and second pneumatic sensors 252-1 and 252-2, first and second ADCs 254-1 and 254-2, and a menu item selection unit 212.

Hereinafter, the construction and operation of the manipulation control apparatus 200A shown in FIG. 5, which performs the menu item selection method 400 in some forms of the present disclosure, will be described.

Referring to FIGS. 5 to 9, one end of each of the protrusion units 229-1 and 229-2 may contact a corresponding one of the rotary plates 232A, and the other end of each of the protrusion units 229-1 and 229-2 may contact the cylinder unit 227-1 or 227-2. For example, for the first protrusion unit 229-1, one end of the 1-1 protrusion 229-11 may contact the first rotary plate 232-1, and the other end the 1-1 protrusion 229-11 may contact the first cylinder unit 227-1. In a similar fashion, one end and the other end of each of the 1-2 to 2-3 protrusions 229-12 to 229-23 may be disposed between a corresponding one of the rotary plates 232A and the cylinder unit 227-1 or 227-2.

In the case in which the protrusion units 229-1 and 229-2 are disposed between the rotary plates 232A and the cylinder units 227-1 and 227-2, as described above, the pressure of air in the cylinder units 227-1 and 227-2 may be changed by the piston movement of the protrusion units 229-1 and 229-2 when the rotary plates 232A are rotated.

Figure 10:
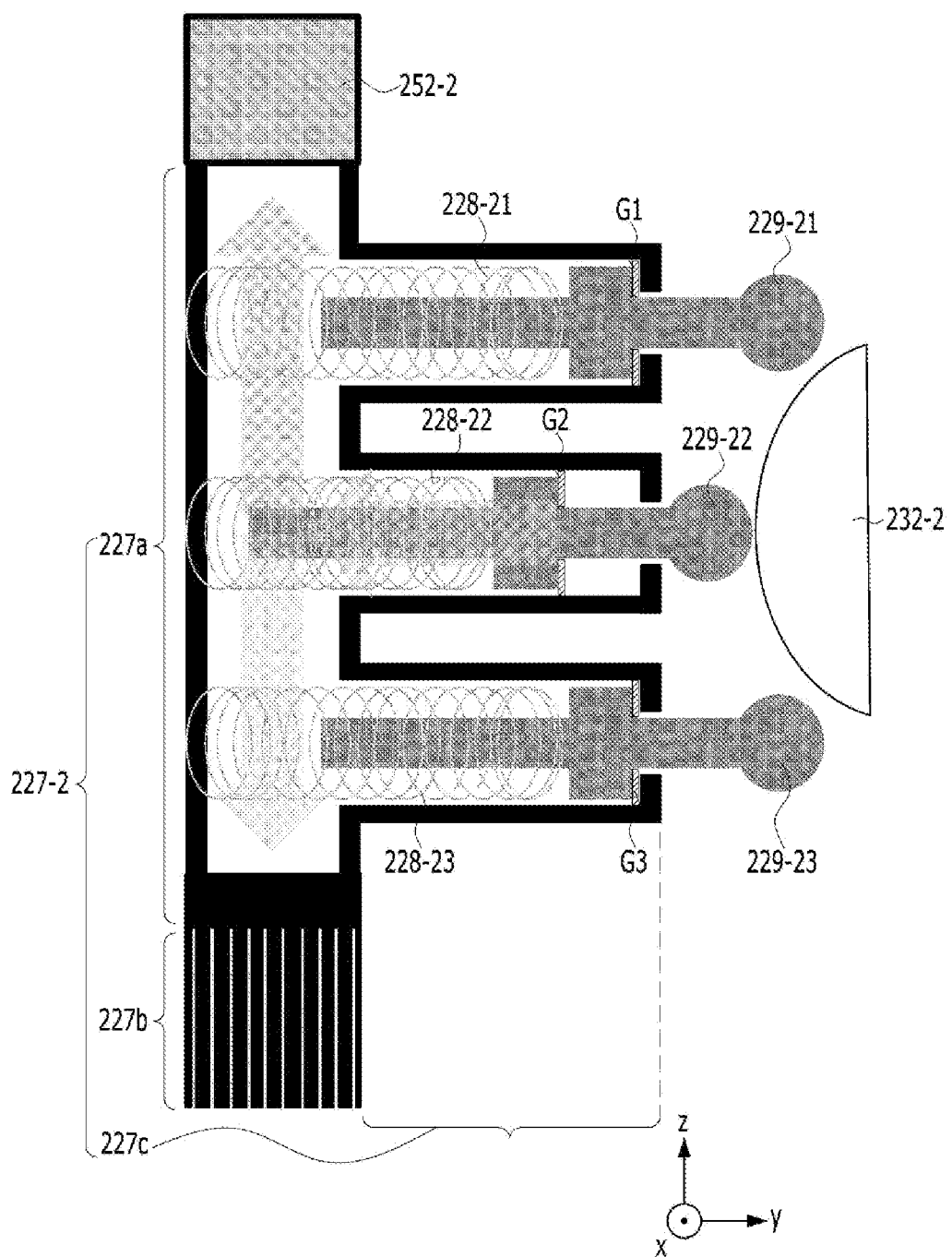
FIG. 10 is a detailed sectional view of a second cylinder unit, a second protrusion unit, and a second pneumatic sensor shown in FIG. 5.

FIG. 10 is a detailed sectional view of the second cylinder unit 227-2, the second protrusion unit 229-2, and the second pneumatic sensor 252-2 shown in FIG. 5.

Hereinafter, the construction of some forms of the second cylinder unit 227-2 will be described with reference to FIG. 10, in order to help the understanding a situation that the internal air pressures in the cylinder unit 227-1 and 227-2 are changeable due to the piston movements of the protrusion units 229-1 and 229-2, as previously described, Since the first cylinder unit 227-1 has the same construction as the second cylinder unit 227-2 shown in FIG. 10, a description of the second cylinder unit 227-2 shown in FIG. 10 is equally applied to the first cylinder unit 227-1.

Referring to FIG. 10, the second cylinder unit 227-2 may include a body 227a, a gear 227b, an accommodation part 227c, and elastic members 228-21 to 228-23.

In order to perform the click sensation provision method, the second cylinder unit 227-2 may include a gear 227b, and the second protrusion unit 229-2 may include a plurality of protrusions 229-21 to 229-23. In the case in which the apparatus 200A shown in FIG. 5 performs only the menu item selection method 400 shown in FIG. 9, however, the second cylinder unit 227-2 may not include the gear 227b, and the second protrusion unit 229-2 may include only one of the protrusions 229-21 to 229-23.

The interior of the second cylinder unit 227-2 must be sealed in order for the second pneumatic sensor 252-2 to sensation variation in air pressure due to the piston movement of the second protrusion unit 229-2. That is, the interior of each of the body 227a and the accommodation part 227c must be sealed. To this end, the second cylinder unit 227-2 may further include gaskets G1 to G3. The gaskets G1 to G3 serve to seal the interior of the second cylinder unit 227-2 while allowing the 2-1 to 2-3 protrusions 229-21 to 229-23 to perform piston movement in the y-axis direction.

The body 227a and the accommodation part 227c of the second cylinder unit 227-2 serve to accommodate air, the pressure of which is changed by the piston movement of one of the 2-1 to 2-3 protrusions 229-21 to 229-23. In addition, the body 227a may support the second pneumatic sensor 252-2, and may be coupled to the second pneumatic sensor 252-2 such that the second pneumatic sensor 252-2 can sensation the pressure of air accommodated in the body 227a.

The gear 227b serves to rotate the body 227a about the central axis thereof (for example, the z-axis) in the clockwise direction or in the counterclockwise direction upon receiving rotational force from the second motor (M2) 225-2.

The accommodation part 227c serves to accommodate the second protrusions 229-21 to 229-23 and the elastic members 228-21 to 228-23, and may have a structure for allowing the piston movement of the second protrusions 229-21 to 229-23.

For example, referring to FIG. 10, when the second rotary plate 232-2 is rotated in response to the manipulation of the manipulation unit 240A in the state in which the 2-2 protrusion 229-22 is in contact with the ridges R or the valleys V formed at the outer circumferential surface of the second rotary plate 232-2, the 2-2 protrusion 229-22 moves in the negative y-axis direction when the 2-2 protrusion 229-22 contacts the ridges R of the second rotary plate 232-2, and the 2-2 protrusion 229-22 moves in the positive y-axis direction when the 2-2 protrusion 229-22 contacts the valleys V of the second rotary plate 232-2. Since the ridges R and the valleys V are alternately formed at the outer circumferential surface of the second rotary plate 232-2, the 2-2 protrusion 229-22 may perform piston movement while alternately moving in the positive y-axis direction and the negative y-axis direction when the second rotary plate 232-2 is rotated.

The elastic members 228-21 to 228-23 are disposed between the other end of the second protrusion unit 229-2 and the second cylinder unit 227-2 such that when the 2-2 protrusion 229-22 alternately contacts the ridges R and the valleys V of the second rotary plate 232-2, the 2-2 protrusion 229-22 performs piston movement while alternately moving in the positive y-axis direction and the negative y-axis direction. Consequently, the number of elastic members 228-21 to 228-23 is equal to the number of protrusions included in the second protrusion unit 229-2. For example, as illustrated in FIG. 10, three elastic members 228-21 to 228-23 may be provided, since the second protrusion unit 229-2 includes three protrusions 229-21 to 229-23. For example, each of the three elastic members 228-21 to 228-23 may be realized by a spring.

Referring back to FIG. 9, in the menu item selection method 400 in some forms of the present disclosure, first, variation in the pressure of air in the cylinder unit is sensed, and the result of sensing is generated as an electrical signal (Step 410). When the user manipulates (for example, rotates) the manipulation unit 240A, the rotary plate 232, which is interlocked with the manipulation unit 240A, is rotated. At this time, the protrusion, which contacts the ridges R or the valleys V formed at the outer circumferential surface of the rotary plate, performs piston movement, whereby the pressure of air in the cylinder unit may be changed.

In order to perform Step 410 in this state, the first pneumatic sensor 252-1 may sensation variation in the pressure of air in the first cylinder unit 227-1 and output the result of sensing as a first electrical signal, and the second pneumatic sensor 252-2 may sensation variation in the pressure of air in the second cylinder unit 227-2 and output the result of sensing as a second electrical signal. To this end, each of the first and second pneumatic sensors 252-1 and 252-2 may be realized by a directional microphone sensor. However, the disclosure is not limited thereto.

Since the results sensed by the first and second pneumatic sensors 252-1 and 252-2 may be weak, each of the first and second pneumatic sensors 252-1 and 252-2 may include an amplifier for amplifying the result of sensing.

Figure 11:
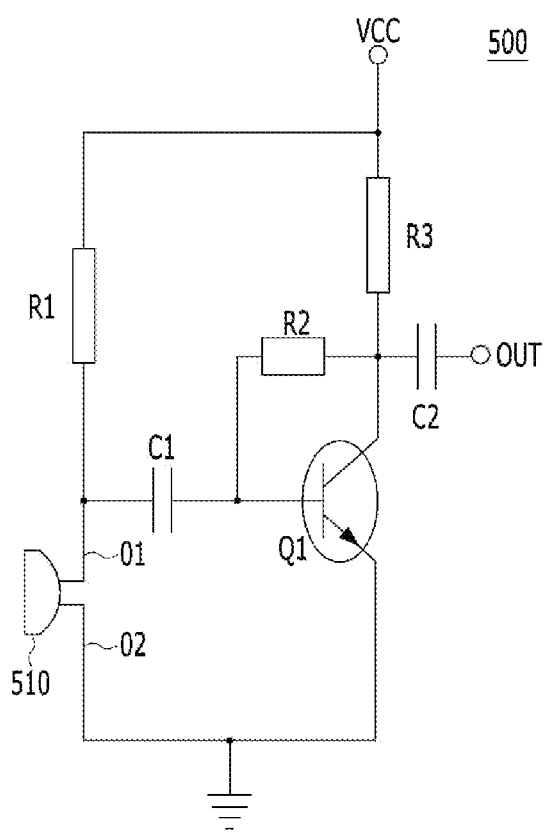
FIG. 11 is a circuit diagram showing an amplifier, which may be included in the pneumatic sensor.

FIG. 11 is a circuit diagram showing an amplifier 500, which may be included in each of the first and second pneumatic sensors 252-1 and 252-2.

The amplifier 500 shown in FIG. 11 may include an electret microphone 510, first to third resistors R1 to R3, first and second capacitors C1 and C2, and a bipolar transistor Q1.

In the case in which each of the first and second pneumatic sensors 252-1 and 252-2 is realized by a directional microphone sensor, the electret microphone 510 outputs a signal corresponding to variation in the pressure of air in the cylinder unit.

The first resistor R1 is disposed between a first output O1 of the electret microphone 510 and a supply voltage VCC, the second resistor R2 is disposed between a collector and a base of the bipolar transistor Q1, and the third resistor R3 is disposed between the supply voltage VCC and the collector of the bipolar transistor Q1. At this time, a second output O2 of the electret microphone 510 may be connected to a reference voltage.

The first capacitor C1 may be disposed between the first output O1 of the electret microphone 510 and the base of the bipolar transistor Q1, and the second capacitor C2 may be disposed between the collector of the bipolar transistor Q1 and an output terminal OUT.

The amplifier 500 having the above-described construction may amplify an electrical signal corresponding to variation in the pressure of air in each of the cylinder units 227-1 and 227-2, and may output the result of amplification through the output terminal OUT.

Meanwhile, after Step 410, the first ADC 254-1 converts the first electrical signal, output from the first pneumatic sensor 252-1, which is an analog signal, into a digital electrical signal, and the second ADC 254-2 converts the second electrical signal, output from the second pneumatic sensor 252-2, which is an analog signal, into a digital electrical signal (Step 420). Consequently, the first and second digital electrical signals may be output to the main controller 221. Depending on the circumstances, at least one of the first or second ADC 254-1 or 254-2 may be omitted.

FIGS. 12(a) to 12(c) are views showing the waveforms of electrical signals generated due to pneumatic variation that is sensed.

For example, a first electrical signal, indicating pneumatic variation sensed by the first pneumatic sensor 252-1 when the 1-2 protrusion 229-12 contacts the second rotary plate 232-2, as shown in FIG. 7, may be converted into a pulse form shown in FIG. 12(b) by the first ADC 254-1.

For example, a first electrical signal, indicating pneumatic variation sensed by the first pneumatic sensor 252-1 when the 1-1 protrusion 229-11 contacts the first rotary plate 232-1, may be converted into a pulse form shown in FIG. 12(a) by the first ADC 254-1.

For example, a first electrical signal, indicating pneumatic variation sensed by the first pneumatic sensor 252-1 when the 1-3 protrusion 229-13 contacts the third rotary plate 232-3, may be converted into a pulse form shown in FIG. 12(c) by the first ADC 254-1.

Referring to FIGS. 12(a) to 12(c), it can be seen that when the number of ridges and valleys formed at the outer circumferential surface of the rotary plate 252 increases, the number of pulses of an electrical signal that is sensed also increases.

After Step 420, the main controller 221 determines at least one of the number of movement clicks or a rotational direction using the first and second digital electrical signals output from the first and second ADCs 254-1 and 254-2 (Step 430). Here, the number of movement clicks, which is the extent to which the manipulation unit 240A is rotated, may mean the number of clicks in which the manipulation unit 240A is rotated, and the rotational direction may mean the direction in which the manipulation unit 240A is rotated.

In each of FIGS. 12(a) to 12(c), a unit pulse may correspond to one click. Consequently, the number of pluses may correspond to the number of clicks. The main controller 221 may count the number of pulses in the first or second electrical signal, and may determine the result of counting as the number of movement clicks.

FIG. 13 is a plan view of the manipulation control apparatus 200A shown in FIG. 5, and FIG. 14 is a view illustrating the concept of rotational direction recognition performed by the apparatus 200A shown in FIG. 13. In FIGS. 13 and 14, the same elements as in FIG. 5 are denoted by the same reference numerals, and a duplicate description thereof will be omitted.

In order to recognize the direction in which the manipulation unit 240A is rotated, as shown in FIGS. 5, 13, and 14, the number of pneumatic sensors 252-1 and 252-2 may be 2, the number of ADCs 254-1 and 254-2 may be 2, the number of cylinder units 227-1 and 227-2 may be 2, and each of the first and second protrusion units 229-1 and 229-2 may include a single protrusion. In the case of FIG. 13, it is assumed that the 1-3 protrusion 229-13 contacts the third rotary plate 252-3 and that the 2-3 protrusion 229-23 contacts the third rotary plate 252-3. However, the following description may also be applied to the case in which the 1-1, 1-2, 2-1, or 2-2 protrusion 229-11, 229-12, 229-21, or 229-22 contacts the first or second rotary plate 252-1 or 252-2. Also, in FIG. 14, reference numeral 229-1 may be one of the 1-1 to 1-3 protrusions 229-11 to 229-13, reference numeral 229-2 may be one of the 2-1 to 2-3 protrusions 229-21 to 229-23, and reference numeral 232 may be one of the first to third rotary plates 232-1 to 232-3.

The first cylinder unit 227-1 contacts the first protrusion 229-1, and when the rotary plate 232 is rotated, the pressure of air in the first cylinder unit 227-1 may be changed due to the piston movement of the first protrusion 229-1.

The second cylinder unit 227-2 contacts the second protrusion 229-2, and when the rotary plate 232 is rotated, the pressure of air in the second cylinder unit 227-2 may be changed due to the piston movement of the second protrusion 229-2.

The main controller 221 may determine the rotational direction of the manipulation unit 240A as follows using the first and second electrical signals.

In order to recognize the rotational direction of the manipulation unit 240A, one of the first and second protrusion units 229-1 and 229-2 may contact the highest projecting portion of a ridge 232r of the rotary plate 232, and the other of the first and second protrusion units 229-1 and 229-2 may contact the vicinity of the highest projecting portion of the ridge 232r or the vicinity of a valley 232v of the rotary plate 232. That is, the first protrusion 229-1 may contact one surface of the rotary plate 232, and the second protrusion 229-2 may contact the other surface of the rotary plate 232, which is opposite the one surface of the rotary plate 232. At this time, the one surface and the other surface of the rotary plate 232 may have different protruding heights. Since the first and second protrusion units 229-1 and 229-2 are disposed so as to be asymmetrical with respect to the rotary plate 232 in a plane, as described above, a first digital electrical signal mic A1 or mic A2 output from the first ADC 254-1 and a second digital electrical signal mic B1 or mic B2 output from the second ADC 254-2 have a phase difference therebetween, as shown in FIG. 14.

In the case in which the rotary plate 232 is rotated in the clockwise direction, indicated by an arrow AR1, the phase of the first electrical signal mic A2 output from the first ADC 254-1 may be later than the phase of the second electrical signal mic B2 output from the second ADC 254-2, and in the case in which the rotary plate 232 is rotated in the counterclockwise direction, indicated by an arrow AR2, the phase of the first electrical signal mic A1 output from the first ADC 254-1 may be earlier than the phase of the second electrical signal mic B1 output from the second ADC 254-2.

Alternatively, in the case in which the rotary plate 232 is rotated in the clockwise direction, indicated by the arrow AR1, the phase of the first electrical signal mic A2 output from the first ADC 254-1 may be earlier than the phase of the second electrical signal mic B2 output from the second ADC 254-2, and in the case in which the rotary plate 232 is rotated in the counterclockwise direction, indicated by the arrow AR2, the phase of the first electrical signal mic A1 output from the first ADC 254-1 may be later than the phase of the second electrical signal mic B1 output from the second ADC 254-2.

As described above, the main controller 221 may compare the phases of the first and second electrical signals output from the first and second ADCs 254-1 and 254-2 with each other to determine whether the rotary plate 232 is rotated in the clockwise direction or in the counterclockwise direction, i.e. the rotational direction of the rotary plate 232.

Meanwhile, after Step 430, the menu item selection unit may select one of the selection menu items on the screen that is being displayed in the vehicle using at least one of the number of movement clicks or the rotational direction (Step 440). To this end, the AVN head unit 212 shown in FIG. 5 may perform Step 440.

In some forms of the present disclosure, when the manipulation control apparatus 200A shown in FIG. 5 performs both the click sensation provision method 100 shown in FIG. 1 and the menu item selection method 400 shown in FIG. 9, the manipulation control apparatus 200A may include a main controller 221, a motor-driving unit 223, first and second motors (M1 and M2) 225-1 and 225-2, first and second cylinder units 227-1 and 227-2, first to third rotary plates 232A, first and second protrusion units 229-1 and 229-2, first and second pneumatic sensors 252-1 and 252-2, first and second ADCs 254-1 and 254-2, and an AVN H/U 212.

A manipulation control apparatus for vehicles according to a comparative example provides only a single click sensation to a user who manipulates the manipulation unit 240 or 240A. In order to recognize whether a screen that is being displayed includes a large number of selection menu items or a small number of selection menu items, therefore, the user who manipulates the manipulation unit 240 or 240A must look at the screen. In the case in which the user is a driver, therefore, the user must look at the displayed screen during driving, whereby his/her gaze may be distracted, which may cause a dangerous situation.

In contrast, the manipulation control apparatus for vehicles in some forms of the present disclosure may provide click sensations that differ depending on the number of selection menu items on the screen that is being displayed to a user through the manipulation unit 240 or 240A. Consequently, it is possible for the user to recognize whether the screen includes a large number of selection menu items or a small number of selection menu items through a click sensation transmitted through the manipulation unit 240 or 240A without looking at the screen. In the manipulation control apparatus for vehicles in some forms of the present disclosure and the click sensation provision method for vehicles performed by the apparatus, it is possible to minimize the distraction of his/her gaze during driving, i.e. it is possible to reduce the extent to which the user must look at the displayed screen, thereby securing the safety of the user. In addition, user-experience performance for a vehicle including the manipulation control apparatus for vehicles in some forms of the present disclosure and the emotional quality of the vehicle may be improved.

Also, in the manipulation control apparatus for vehicles in some forms of the present disclosure and the click sensation provision method for vehicles performed by the apparatus, the number of clicks for a click sensation that is provided to the user is proportional to the number of selection menu items on a screen that is being displayed in a vehicle. Therefore, the number of clicks is small for a screen having a small number of selection menu items, whereby it is possible to increase the precision of menu item selection and to prevent the occurrence of manipulation errors due to overturning of the manipulation unit 240 or 240A. On the contrary, in the case in which the screen has a large number of selection menu items, the number of clicks for a click sensation that is provided to a user is large, whereby it is possible to increase the speed at which the selection menu items are retrieved.

Also, in the manipulation control apparatus for vehicles in some forms of the present disclosure and the click sensation provision method for vehicles performed by the apparatus, it is possible for the user to freely select a click sensation, as shown in FIG. 4, whereby it is possible to satisfy the taste of the user and thus to improve marketability of vehicles.

Also, in the manipulation control apparatus for vehicles in some forms of the present disclosure and the click sensation provision method for vehicles performed by the apparatus, at least one of the number of movement clicks or the rotational direction of the manipulation unit 240 or 240A may be determined using pneumatic pressure, and a menu item may be selected using the same. Consequently, it is possible to reduce the amount of calculation that is performed by the main controller 221. In addition, it is possible to enable the user to more rapidly select a desired menu item due to the reduced amount of calculation.

As is apparent from the above description, a manipulation control apparatus for vehicles and an operation method thereof have the effects of preventing the distraction of a user's gaze during driving, improving user-experience performance for a vehicle and the emotional quality of the vehicle, increasing the precision of menu item selection, preventing the occurrence of errors due to overturning of a manipulation unit, increasing the menu item retrieval or selection speed, improving marketability of vehicles, and enabling the user to rapidly select a menu item.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for operating a manipulation controller for vehicles where the manipulation controller is configured to serve as a click sensation provider for the vehicles, the method comprising:
   determining a number of selection menu items on a screen that is displayed in a vehicle;
   selecting a click sensation corresponding to the determined number of the selection menu items from among a plurality of click sensations; and
   providing the selected click sensation to a user through a manipulation unit that is configured to manipulate the screen.

2. The method of claim 1, wherein the method comprises:
   setting in advance click sensations that differ corresponding to the number or a numeric range of the selection menu items on the screen.

3. The method of claim 1, wherein the method further comprises:
   determining whether the user wishes to receive the click sensations that differ corresponding to the determined number of the selection menu items,
   wherein the selected click sensation is provided to the user in response to a result of determination.

4. The method of claim 1, wherein the click sensation comprises at least one of an audible sensation or a tactile sensation.

5. The method of claim 4, wherein a number of clicks for the click sensation is proportional to the number of the selection menu items on the screen.

6. A manipulation controller for vehicles comprising:
   a number determinator configured to determine a number of selection menu items on a screen that is displayed in a vehicle;
   a click sensation selector configured to select a click sensation corresponding to the determined number of the selection menu items from among a plurality of click sensations; and
   a click sensation provider configured to provide the selected click sensation to a user through a manipulation unit that is configured to manipulate the screen.

7. The manipulation controller of claim 6, wherein the number determinator comprises an Audio Video Navigation (AVN) head unit.

8. The manipulation controller of claim 6, wherein the click sensation selector comprises:
   a main controller configured to generate a driving control signal corresponding to the determined number of the selection menu items;
   a motor-driving unit configured to generate a motor-driving signal corresponding to the driving control signal;
   a motor configured to rotate at a number of rotations corresponding to the motor-driving signal;
   a cylinder configured to rotate at a same number of rotations as the motor; and
   a plurality of protrusions configured to protrude from the cylinder in different directions and to be spaced apart from one another,
   wherein one protrusion of the plurality of protrusions is configured to contact the click sensation provider corresponding to a rotation of the cylinder.

9. The manipulation controller of claim 8, wherein the click sensation provider comprises:
a plurality of rotary plates configured to couple to the manipulation unit that is manipulated by the user, wherein each rotary plate of the plurality of rotary plates is provided at an outer circumferential surface thereof with different numbers of ridges and valleys that are alternately arranged,
wherein the one protrusion of the plurality of protrusions is configured to face one rotary plate of the plurality of rotary plates corresponding to the rotation of the cylinder, and
wherein, when the manipulation unit rotates, the one protrusion of the plurality of protrusions is configured to alternately contact the ridges and the valleys of the rotary plate of the plurality of rotary plates and the selected click sensation is generated and transmitted to the manipulation unit.

10. A manipulation controller for vehicles, comprising:
a rotary plate coupled to a manipulation unit that is manipulated by a user, wherein the rotary plate is provided at an outer circumferential surface thereof with ridges and valleys that are alternately arranged;
a protrusion unit having one end that contacts the rotary plate;
a cylinder configured to contact another end of the protrusion unit, wherein a pressure of air in the cylinder is changed due to a piston movement of the protrusion unit when the rotary plate rotates;
a pneumatic sensor configured to sense variation in the pressure of air in the cylinder and to output a result of sensing as an electrical signal;
a main controller configured to calculate a number of movement clicks of the manipulation unit using the electrical signal; and
a menu item selector configured to select a corresponding menu item from among a plurality of selection menu items on a screen that is displayed in a vehicle based on the calculated number of movement clicks of the manipulation unit.

11. The manipulation controller of claim 10, wherein the cylinder comprises:
an elastic member disposed between the another end of the protrusion unit and an inner wall of the cylinder, wherein the elastic member is configured to allow the piston movement of the protrusion unit when the one end of the protrusion unit contacts the ridges and the valleys of the rotary plate.

12. The manipulation controller of claim 10, wherein the protrusion unit comprises:
a first protrusion unit configured to contact one surface of the rotary plate; and
a second protrusion unit configured to contact another surface of the rotary plate that is an opposite end of the one surface of the rotary plate,
wherein the one surface of the rotary plate and the another surface of the rotary plate are configured to have different protruding heights.

13. The manipulation controller of claim 12, wherein the cylinder comprises:
a first cylinder configured to contact the first protrusion unit, wherein a pressure of air in the first cylinder is changed due to a piston movement of the first protrusion unit when the rotary plate rotates; and
a second cylinder configured to contact the second protrusion unit, wherein a pressure of air in the second cylinder is changed due to a piston movement of the second protrusion unit when the rotary plate rotates.

14. The manipulation controller of claim 13, wherein the pneumatic sensor comprises:
a first pneumatic sensor configured to sense variation in the pressure of air in the first cylinder and to output a result of sensing as a first electrical signal; and
a second pneumatic sensor configured to sense variation in the pressure of air in the second cylinder and to output a result of sensing as a second electrical signal.

15. The manipulation controller of claim 14, wherein the first pneumatic sensor includes a first amplifier configured to amplify the result of sensing and to output a result of amplifying as the first electrical signal, and
wherein the second pneumatic sensor includes a second amplifier configured to amplify the result of sensing and to output a result of amplifying as the second electrical signal.

16. The manipulation controller of claim 14, wherein the main controller is configured to determine a rotational direction of the manipulation unit using the first electrical signal and the second electrical signal, and
wherein the menu item selector is configured to select the corresponding menu item using at least one of the number of movement clicks of the manipulation unit or the rotational direction of the manipulation unit.

17. The manipulation controller of claim 16, wherein the main controller is configured to determine the rotational direction of the manipulation unit using a difference in phase between the first electrical signal and the second electrical signal.

18. The manipulation controller of claim 10, wherein the manipulation controller further comprises:
an analog-to-digital converter configured to convert the electrical signal output from the pneumatic sensor into a digital electrical signal,
wherein the main controller is configured to calculate the number of movement clicks of the manipulation unit using the digital electrical signal.

19. A method for operating a manipulation controller for vehicles where the manipulation controller is configured to serve as a menu item selector, the method comprising:
sensing variation in a pressure of air in a cylinder and generating a result of sensing as an electrical signal;
calculating a number of movement clicks of a manipulation unit using the electrical signal; and
selecting a corresponding menu item from among a plurality of selection menu items based on the number of movement clicks of the manipulation unit.

20. The method of claim 19, wherein the method further comprises:
determining a rotational direction of the manipulation unit using the electrical signal,
wherein the corresponding menu item is selected using at least one of the number of movement clicks of the manipulation unit or the rotational direction of the manipulation unit.

* * * * *